United States Patent
Janisiewicz et al.

(10) Patent No.: US 6,873,130 B2
(45) Date of Patent: Mar. 29, 2005

(54) METHOD AND APPARATUS FOR MAINTAINING FORCE OF A VARIABLE RELUCTANCE MOTOR

(75) Inventors: Stan Janisiewicz, Endwell, NY (US); Darrin M. Weiss, Vestal, NY (US); Andrew Zalesski, Apalachin, NY (US)

(73) Assignee: Delaware Capital Formation, Wilmington, DE (US)

( * ) Notice: Subject to any disclaimer, the term of this patent is extended or adjusted under 35 U.S.C. 154(b) by 0 days.

(21) Appl. No.: 09/904,731

(22) Filed: Jul. 12, 2001

(65) Prior Publication Data

US 2003/0011341 A1 Jan. 16, 2003

(51) Int. Cl.[7] .............................. H02P 1/46; H02P 3/18; H02P 5/28; H02P 7/36
(52) U.S. Cl. ..................... 318/701; 318/704; 318/716
(58) Field of Search ............................ 318/701, 704, 318/715–717, 719, 724, 727, 798

(56) References Cited

U.S. PATENT DOCUMENTS

| | | | |
|---|---|---|---|
| 3,697,842 A | * 10/1972 | Morill | .................. 318/223 |
| 3,769,555 A | 10/1973 | Dolbachian et al. | |
| 4,143,308 A | 3/1979 | Deplante et al. | |
| 4,296,344 A | * 10/1981 | Rabe | .................. 318/777 |
| 4,322,665 A | * 3/1982 | Landgraf | .................. 318/774 |
| 4,625,158 A | 11/1986 | Taenzer | |
| 4,731,570 A | 3/1988 | Lee | |
| 4,853,604 A | * 8/1989 | McMullin et al. | .......... 318/653 |
| 4,906,060 A | * 3/1990 | Claude | .................. 318/502 |
| 5,225,758 A | 7/1993 | Sakano et al. | |
| 5,333,474 A | * 8/1994 | Imai et al. | .................. 318/754 |
| 5,621,294 A | 4/1997 | Bessette et al. | |
| 5,637,974 A | 6/1997 | McCann | |
| 5,821,723 A | * 10/1998 | Kim | .................. 318/701 |
| 5,825,153 A | 10/1998 | Doyle | |
| 5,838,133 A | 11/1998 | McCann | |
| 5,872,441 A | 2/1999 | McCann | |
| 5,896,020 A | 4/1999 | Pyo | |
| 5,912,542 A | * 6/1999 | Zalesski | .................. 318/701 |
| 5,955,861 A | 9/1999 | Jeong et al. | |
| 5,982,117 A | 11/1999 | Taylor et al. | |
| 6,208,108 B1 | 3/2001 | Nashiki et al. | |

* cited by examiner

Primary Examiner—Marlon T. Fletcher
(74) Attorney, Agent, or Firm—Banner & Witcoff, Ltd.

(57) ABSTRACT

The invention provides a method and apparatus for maintaining the force, or torque, delivered by a variable reluctance motor as the speed of the motor increases. The method comprises the steps of sensing the speed of the motor and varying the number of turns of the motor's phase coil based on the sensed speed. The apparatus includes a motor speed sensor for sensing the speed of the motor and an inductance switch for switching the number of turns of the phase coil from a first value to a second value based on the sensed speed. One embodiment of the invention includes an inductance compensation circuit to compensate for the change in load inductance when the number of turns of the phase coil is switched.

7 Claims, 4 Drawing Sheets

METHOD AND APPARATUS FOR MAINTAINING FORCE OF A VARIABLE RELUCTANCE MOTOR

BACKGROUND OF INVENTION

The invention relates to motor control circuits and in particular to an inductance switching circuit for increasing performance of a motor such as a variable reluctance motor.

Conventional variable reluctance motors operate with a plurality of coils (hereinafter "phase coils"), each coil corresponding to a phase of the motor and comprising a fixed number of turns of wire. The current in each of the phase coils is turned on and off each time a rotor pole passes a stator pole. Such a configuration creates a magneto-motive force which causes motion of the rotor relative to the stator.

A problem with conventional variable reluctance motors is the reduction in motor force (torque in rotary motors) delivered by such motors at high speeds, that is, speeds at which the current in the motor's phase coils cannot reach a desired value due to the inductance of the phase coils. There is a substantial and long felt need in the industry for motors that can operate effectively at higher speeds. It is therefore desirable to overcome the above-described limitations of conventional motor performance, including obtaining a higher motor force at higher speeds.

SUMMARY OF INVENTION

The invention provides a method and apparatus for maintaining the force (torque in a rotary motor) delivered by a variable reluctance motor including at least one phase coil as the speed of the motor increases. The method comprises the steps of sensing the speed of the motor and varying the inductance of the phase coil based on the sensed speed. The apparatus includes a motor speed sensor for sensing the speed of the motor and an inductance switch for switching the inductance of the phase coil from a first value to a second value based on the sensed speed. One embodiment of the invention includes an inductance compensation circuit to compensate for the change in load inductance when the inductance of the phase coil is switched.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Figure 1:
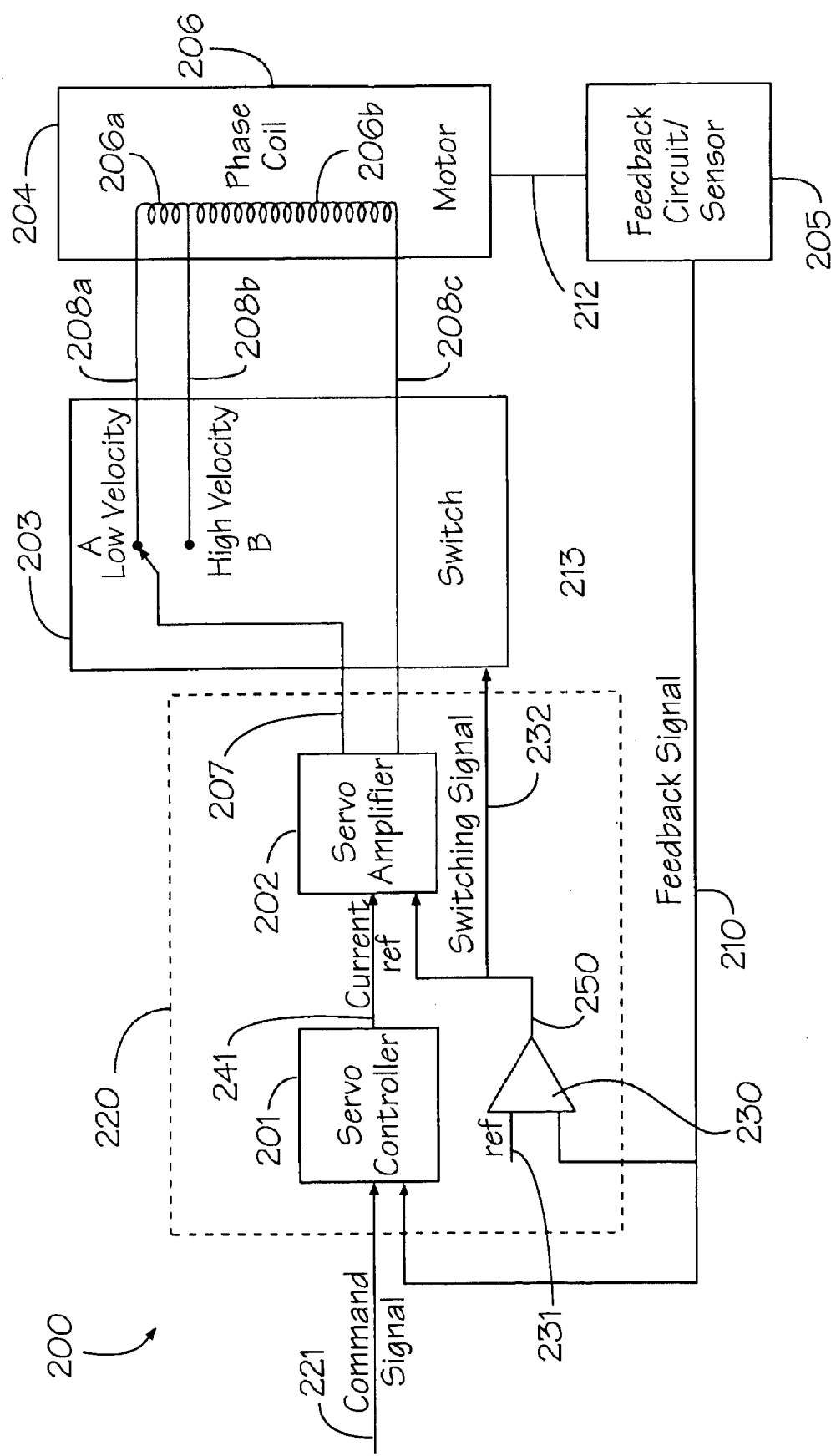
FIG. 1 is a block diagram of the apparatus of the invention.

FIG. 1 illustrates an exemplary embodiment of a motor system 200 of the invention. Motor system 200 comprises a motor 204 including at least one motor winding 206 (hereinafter "phase coil" 206). Phase coil 206 comprises at least a first coil portion 206a, having a first number of turns, $N_a$, and a second coil portion 206b, having a second number of turns $N_b$.

Figure 4:
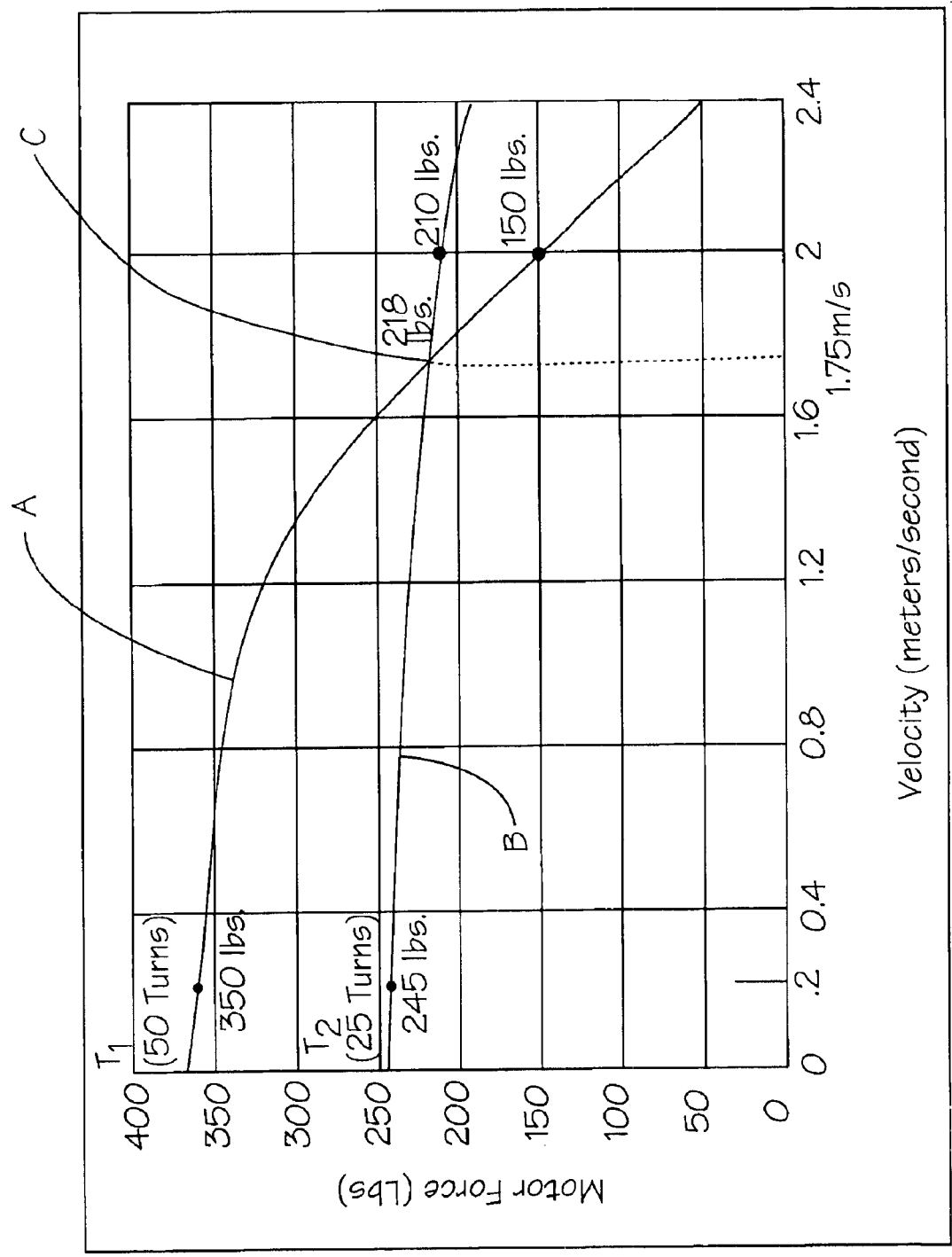
FIG. 4 is a graph illustrating the relationship between motor force and motor velocity for two values of T, wherein T is number of turns of a phase coil.

In general the force, or torque, delivered to a load by a motor tends to decrease as motor velocity increases. The rate of decrease is related to the inductance of the phase coil of the motor. The inductance of a phase coil is related to the number of turns the coil comprises. FIG. 4 illustrates two force curves, A and B. The curves represent motor force as a function of motor velocity. Curve A represents a motor having T1 (for example 50) turns in a phase coil. Curve B represents a motor having fewer turns T2 (for example 25) in a phase coil. As shown in the figure, the force represented by curve A is higher than that represented by curve B at lower motor velocities, e.g., below about 1.75 meters per second. However, the force represented by curve A decreases to a value below that of curve B when motor velocity increase past about 1.75 meters per second.

The present invention takes advantage of the relationship of curves A and B as illustrated in FIG. 4 by switching the number of turns of phase coil 206 from a higher value, e.g., T1, to a relatively lower value, e.g., T2, at the a "threshold value" of motor speed. The threshold value is the point C where curves A and B intersect. Switching the number of turns in this manner has the effect of maintaining the force of the motor as much as motor velocity increases.

To accomplish this switching, system 200 includes switch 203, as seen in FIG. 1. Switch 203 is coupled to first coil portion 206a and second coil portion 206b such that he total number of turns comprising phase coil 206 is switchable between a first number of turns, T1, and a second number of turns, T2. In the embodiment shown in FIG. 1 first coil portion 206a and 206b are coupled in series. Therefore, when switch 203 is set to position A, the total number of turns of phase coil 206 is:

$$T_1 = N_a + N_b. \quad (1)$$

When switch 203 is set to position B, the total number of turns of phase coil 206 is:

$$T_2 = N_b. \quad (2)$$

Figure 2:
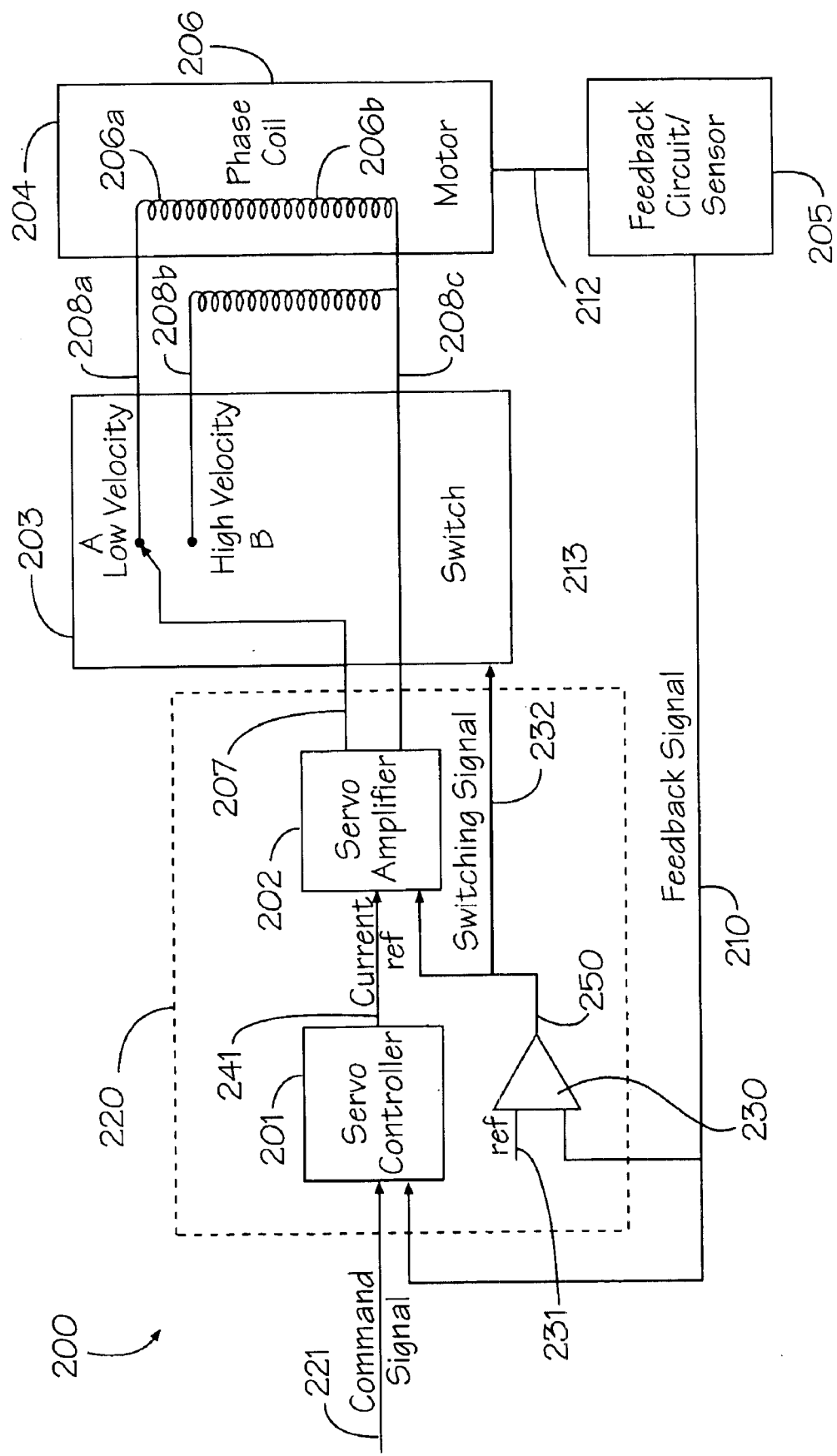
FIG. 2 is a block diagram of an alternative embodiment of the invention

An alternative embodiment is illustrated in FIG. 2, wherein first coil portion 206a and second coil portion 206b are separately switched coil portions. When switch 203 is set to position A, the total number of turns of phase coil 206 is:

$$T_1 = N_b. \quad (3)$$

When switch 203 is set to position B, the total number of turns of phase coil 206 is:

$$T_2 = N_a. \quad (4)$$

Those of ordinary skill in the art will recognize that a variety of configurations of coil portions and switches could be implemented to achieve switching between first ($T_1$) and second ($T_2$) inductance values. All of these arrangements are intended to remain within the scope of the invention.

Returning to FIG. 1, system 200 further comprises a sensor 205 coupled to motor 204. Sensor 205 is a conventional, commercially available motor speed sensor for sensing the speed of a motor and providing an output signal 210 representative of the sensed motor speed. In the illustrated embodiment, signal 210 is provided as a feedback signal to a motor drive circuit 220. Motor drive circuit 220 includes typical motor drive components such as servo controller 201 and servo amplifier 202. However, in contrast to conventional motor drive circuits, circuit 220 further includes a comparing circuit 230 having an output signal 250 provided to inductance switch 203.

Comparing circuit 230 receives feedback signal 210 and compares it to a reference signal 231. Reference signal 231 represents the motor speed threshold value illustrated at C in FIG. 4. In one embodiment of the invention reference signal 231 is set to a value representing a motor speed of about 1.75 meters per second. When feedback signal 210 approximately reaches the threshold value, the comparison condition is met, and comparison circuit 230 provides a switching signal 250 to switch 203 causing switch 203 to toggle from position A to position B. Thus, the number of turns T of phase coil 206 is switched from a higher value $T_1$ to a lower inductance value $T_2$. The higher value tends to increase the force delivered by motor 204 compared to the force delivered by by the lower value when motor 204 operates at higher speeds.

Figure 3:
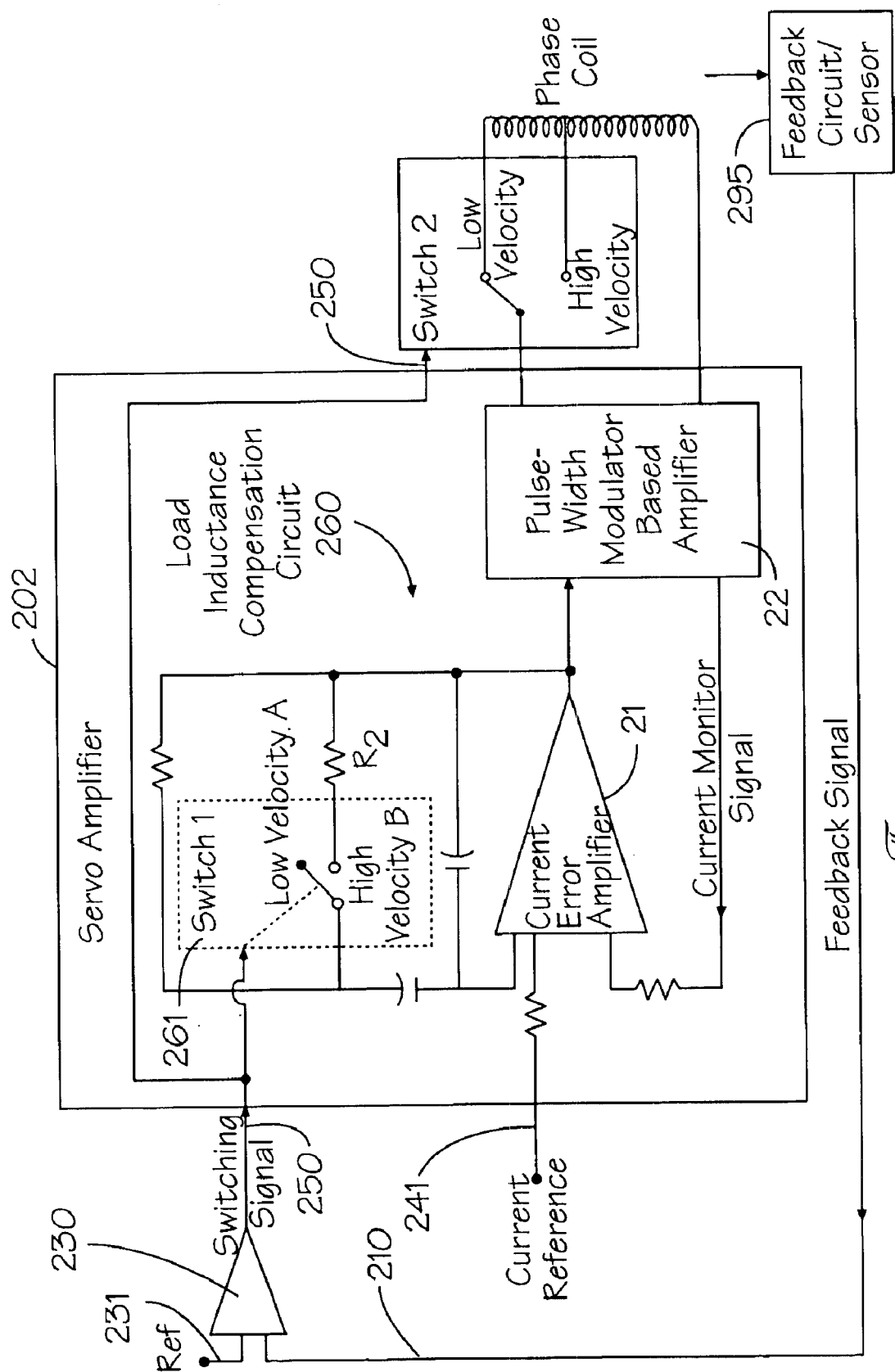
FIG. 3 is a detailed diagram of the servo amplifier shown in FIG. 1.

When the number of turns of phase coil 206 is switched from T1 to T2, the load inductance seen at the output of servo amplifier 202 changes. Typical commercially available servo amplifiers operate properly over a limited-load inductance range. Therefore, one embodiment of the invention includes a load inductance compensation circuit 260, as illustrated in FIG. 3. Circuit 260 compensates for the change in load inductance when the number of turns comprising phase coil 206 is switched from T1 (low velocity) to T2 (high velocity). To accomplish this, switching signal 250 is provided to inductance compensation switch 261, as well as to inductance switch 203.

When motor speed feedback signal 210 is lower than reference signal 231, inductance compensation switch 261 is in position A. In this position, resistor R2 is uncoupled from compensation circuit 260. When the speed of motor 204, as represented by feedback signal 210, becomes greater than reference signal 231, switching signal 250 causes switch 261 to switch to position B. In this position, resistor R2 is coupled to compensation circuit 260.

Pulse-width-modulator (PWM)-based amplifier 22 is coupled to phase coil 206 through switch 203. Pulse-width-modulator (PWM)-based amplifier 22 is controlled by the output of current error amplifier 21. Pulse-width-modulator (PWM)-based amplifier 22 also provides a current monitor signal proportional to a current in a phase coil 206 of motor 204, to current error amplifier 21. The current monitor signal is compared to current reference signal 241. The difference between the current reference signal and the current monitor signal is amplified by amplifier 21 and provided to pulse width modulator 22. The amplification factor of current error amplifier 21 is controlled by load inductance compensation circuit 260. As previously discussed, the amplification factor changes as the number of turns of phase coil 206 changes from $T_1$ to $T_2$ and vice versa.

For a detailed example of a suitable variable load inductance compensation circuit, see U.S. Pat. No. 5,912,542 to Zalesski.

In one embodiment of the invention, sensor 205 detects the speed of motor 204. In an alternative embodiment, sensor 205 detects the position of motor 204. One embodiment of the invention further includes a processor for generating a feedback signal depending upon the speed of the motor 204. Sensors for detecting the speed or position of a motor are known and readily commercially available. In one embodiment of the invention, feedback circuit 205 determines the speed of the motor 204 on a continuous basis. In an alternative embodiment of the invention feedback circuit 206 samples the motor speed at intervals. In one embodiment, the feedback signal is digital and in another embodiment it is analog. In one embodiment of the invention the threshold speed is predetermined and stored in the system controller 201.

In one embodiment of the invention, switch 203 is single-throw double-pole switch, controlled by switching signal 250. In one embodiment, switch 203 is a solid state switch. Switch 203 is selected to withstand the currents required to operate the motor 204. In one exemplary embodiment, switch 203 is rated to operate at alternating currents of at least 30 amperes peak-to-peak. In an alternative embodiment of the invention, switch 203 is activated when current in phase coil 206 is nominally zero.

In one embodiment of the invention, motor 204 is a linear variable reluctance motor. In an alternative embodiment of the invention, motor 204 is a rotary variable-reluctance motor. In one embodiment of the invention, motor 204 comprises three phase windings. However, the invention is suitable for use with motors having two phases, three phases, or more phases.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A method for maintaining the force delivered by a variable reluctance motor including at least one phase coil, the method comprising the steps of:

sensing a speed of said variable reluctance motor; and varying the inductance of said phase coil based on said sensed speed, wherein said varying the inductance step comprises changing the number of turns of said phase coil from a first number of turns to a second number of turns.

2. The method of claim 1, wherein the step of varying the inductance of said phase coil is carried out when said sensed speed reaches a reference speed.

3. The method of claim 1, wherein the step of varying the inductance of said phase coil is carried out when said sensed speed is about the speed at which saturation of a core of a phase coil of said variable reluctance motor occurs.

4. The method of claim 1, wherein the step of varying the inductance of said phase coil occurs at approximately the motor speed at which the motor force corresponding to a first number of turns (T1) of said phase coil is about the same as the motor force corresponding to a second number of turns (T2) of said phase coil.

5. The method of claim 1 further including a step of compensating said variable reluctance motor for said varying inductance of said phase coil.

6. In a motor system including a variable reluctance motor having at least one phase coil, said system comprising:

a sensor coupled to said variable reluctance motor, said sensor providing a feedback signal representative of a speed of said variable reluctance motor between at least a low range and a high range;

a comparing circuit for comparison of said feedback signal to a reference signal and for providing a switching signal based on results of said comparison; and a switch coupled to said comparing circuit and responsive to said switching signal such that the number of turns of said phase coil is changed from a higher number of turns for said low range to a lower number of turns for said high range, whereby the force delivered by said variable reluctance motor is maintained.

7. A motor system including a variable reluctance motor comprising at least one phase coil having a first number of turns, said system further comprising:

a motor speed sensor coupled to said variable reluctance motor for sensing a speed of said variable reluctance motor;

a switch coupled to said phase coil of said variable reluctance motor; and a driving circuit coupled to said motor speed sensor and to said switch such that said switch changes the number of turns of said phase coil from said first number to a second number when said speed of said variable reluctance motor reaches a reference value, whereby the force delivered by said variable reluctance motor is maintained.

* * * * *